United States Patent Office 2,950,745

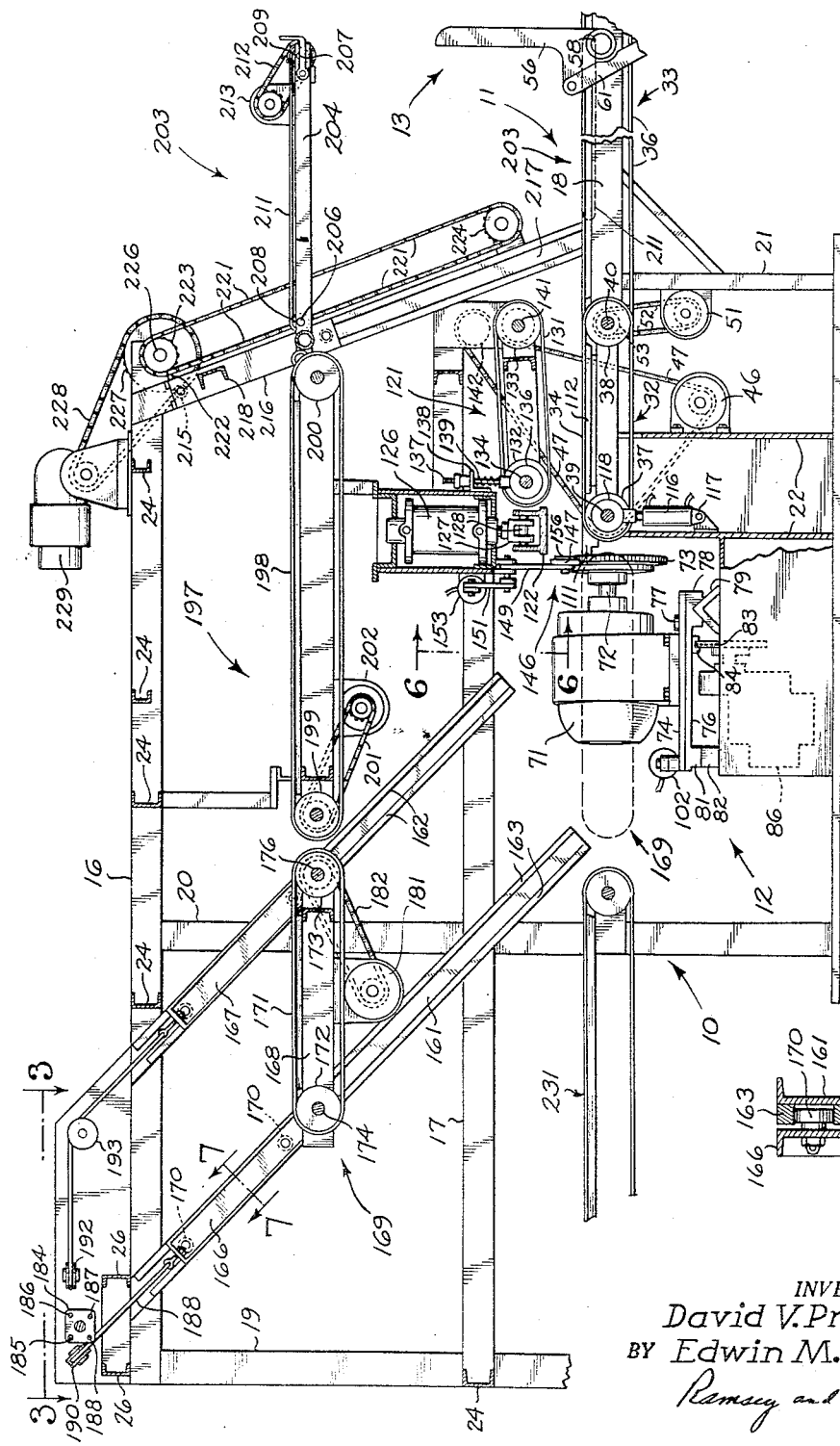

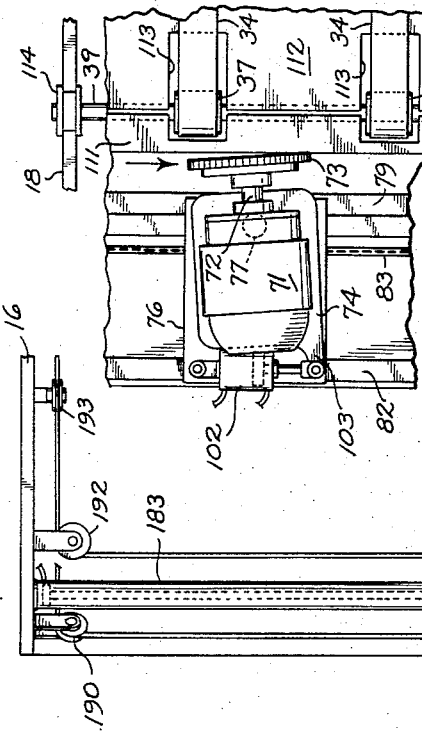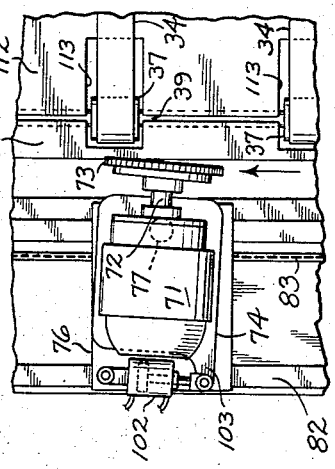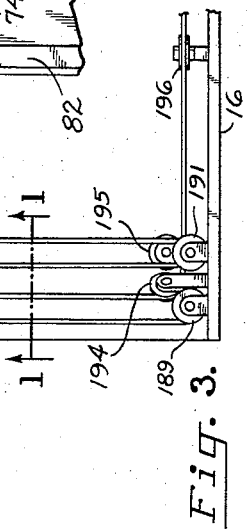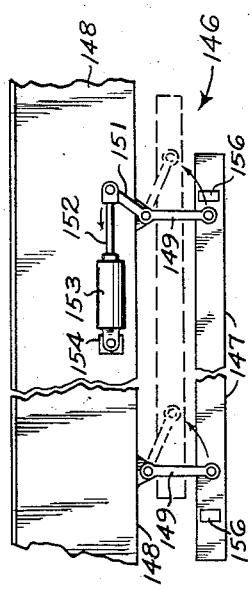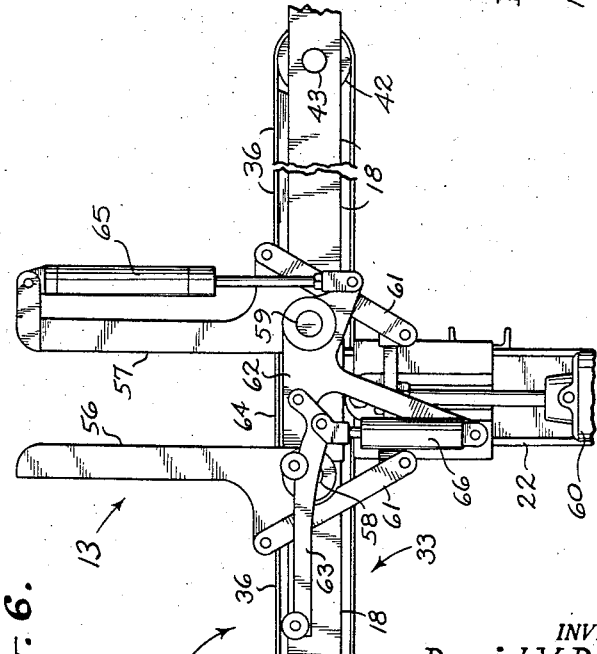

Patented Aug. 30, 1960

2,950,745

JOINTER APPARATUS AND METHOD

David V. Prentice and Edwin M. Heth, Portland, Oreg., assignors to Prentice Machine Works, Inc., Portland, Oreg., a corporation of Oregon Filed Nov. 4, 1957, Ser. No. 694,150

7 Claims. (Cl. 144—309)

This invention relates to veneer jointer apparatus and method, and more particularly to apparatus and method for cutting a straight edge along the margins of veneer sheets.

In the manufacture of composite wood products such as plywood, it is a common practice in preparing one of the layers in the product to join together in edge to edge abutting relation a plurality of thin sheets of veener. In order that the sheets can be successfully abutted against each other, it is important that the margins of the veneer sheets first be prepared with a straight edge. Identations or other interruptions in the edges of a veneer sheet create spaces or cracks between successive pieces which detract from the value of the product made therefrom.

A general object of this invention is to provide apparatus and method for preparing straight edges along the margins of veneer sheets which is characterized by speedy and efficient operation, whereby increased economies are realized over production methods employed heretofore.

This invention contemplates the production of straight edged veneer sheets by transporting the veneer sheets through a handling system which includes a jogger or shaker mechanism, and a cutter mechanism spaced therefrom. Bundles or stacks of veener sheets, comprised of a plurality of veener pieces one on top of the other, are introduced into the handling system and transported first to the jogger or shaker where the margins of the sheets along one side of the bundle are aligned by joggling the bundle. The bundle is then transported into a cutting station adjacent the cutter mechanism, and a straight edge produced in the sheets of the bundle along one of its sides. The bundle of sheets is then transported forwardly through and beyond the cutting station, freeing the cutting station for a subsequent cutting operation on a following bundle.

After leaving the cutting station, a bundle which has been cut along one side is returned to the shaker mechanism. The shaker mechanism then shakes the bundle a second time so as to align the sheet margins on the other side of the bundle. After alignment, the bundle is recirculated by transporting the bundle into the cutting station, and the cutter mechanism operated to cut a straight edge along the other side of the bundle.

The bundle of veneer sheets is advanced forwardly through and beyond the cutting station and past the cutter mechanism, so as to free the cutting station for the reception of a succeeding bundle with only a small time loss. Bundles of veneer, once the margins along one side of the bundle are aligned, should be moved relatively slowly and smoothly to prevent the sheets of the bundle from being joggled thereby to produce misalignment. For this reason, it is quite desirable that the cutting station be freed of a bundle as soon as possible, if a fast and efficient operation is to be obtained. Movement of a bundle forwardly out of the cutting station enables a succeeding bundle to be prepared for a cut by the cutter mechanism at the same time that a preceding bundle is being returned for its second shaking. In other words, the time utilized for making a cutting pass on one bundle is used for returning another bundle to the jogger mechanism and shaking this other bundle. Once a bundle has been cut along both of its sides, the bundle, instead of being returned, is transported forwardly out of the apparatus where it is further processed to produce a composite board.

In the cutting of veneer sheets, to eliminate ragged edges and irregularities along the cut margins, it has been found desirable to use a rotary, disc-type cutterhead. The cutterhead is moved during a cut in a lineal cutting path extending transversely of the path of travel of the veneer sheets, while simultaneously rotating the disc-type cutterhead to produce the cut. If the plane of the cutterhead is offset or canted somewhat relative to the line of cut, a better cut results. Further, the cutterhead is more likely to clear itself of chips, etc. collected during cutting of the veneer. The offset or cant is usually not large, ordinarily consisting of fractions of a degree. The offset is such that during a cut, the leading or cutting portions of the cutterhead are disposed slightly inwardly toward the main body of veneer being cut, relative to the trailing portions of the cutterhead, which are spaced slightly outwardly from the main body of veneer. This invention contemplates means for varying the cant or offset of the cutterhead enabling the cutterhead to make a cut moving in either direction across the veneer. In the organization contemplated by this invention, this is particularly valuable as it eliminates delay.

This invention also includes novel mechanism for returning and recirculating the veneer bundles after they are moved forwardly of the cutting station. The mechanism includes a carriage movable up and down between a position wherein the carriage receives a cut bundle, to another position wherein the bundle may be transported over the cutter mechanism and rearwardly to the shaking mechanism. The return mechanism is constructed so as to introduce a minimum amount of disarrangement into the veneer pieces of a bundle, and to keep to a minimum loss through breaking or chipping of the veneer pieces.

These and other novel features, objects and advantages are attained by the present invention, the invention being described hereinbelow in conjunction with accompanying drawings wherein:

Fig. 1 illustrates the forward end of apparatus constructed according to this invention, showing the cutter mechanism and cutting station for the apparatus, and the mechanism for moving bundles forwardly through the cutting station and around the cutting station to a point spaced rearwardly thereof;

Fig. 2 illustrates a shaker mechanism located rearwardly in the apparatus, Fig. 2 being drawn in slightly larger scale;

Fig. 3 is a view along the line 3—3 in Fig. 1, illustrating details of the motor mechanism employed for moving a carriage present in the construction;

Fig. 4 is a view looking downwardly at the cutter mechanism illustrated in Fig. 1;

Fig. 5 is a view similar to Fig. 4 but illustrating the cutter mechanism in another position;

Fig. 6 is a view along the line 6—6 of Fig. 1; and

Fig. 7 (Sheet 1) is a view, slightly enlarged, along the line 7—7 of Fig. 1.

Referring now to the drawings for a more detailed description of an embodiment of this invention, and in particular to Figs. 1 and 2, apparatus constructed according to this invention comprises generally frame structure 10 mounting a conveyor mechanism indicated generally at 11. Mounted in frame 10 at the forward end of conveyor mechanism 11 is a cutter mechanism 12, and rearwardly of the cutter mechanism is a shaker mechanism 13.

Frame structure 10 is comprised of horizontal members, such as members 16, 17, and 18 illustrated in Figs. 1 and 2, each having a counterpart spaced laterally on the other side of the apparatus and providing a support for the various mechanisms employed. Interlaced with members 16, 17, and 18 are vertical members such as members 19, 20, and 21. Cross members indicated at 24 and 26 extend transversely of the frame and function to hold the lateral portions of the frame in spaced alignment.

In the embodiment illustrated, conveyor mechanism 11 has a pair of conveyor sections 32 and 33. Each of the conveyor sections 32, 33 is comprised of a series of continuous belts, spaced laterally from each other over the conveyor section, and represented by belt 34 for section 32, and belt 36 for section 33. Belts 34 of conveyor section 32 are reeved about pulleys, such as pulleys 37 and 38 disposed at the forward and rear end of conveyor section 32, respectively. Pulleys 37, 38 are mounted on pulley shafts 39, 40 which extend transversely of the conveyor section and are mounted rotatably at their ends in the frame structure of the apparatus. In a similar manner, belts 36 are reeved about forward and rear pulleys, such as the rear pulley 42 illustrated. The forward pulleys for each belt 36 are non-rotatably mounted on pulley shaft 40, and pulleys 42 are supported on pulley shaft 43 parallel to shaft 40 but rearwardly thereof.

Pulleys 37 are affixed to pulley shaft 39 whereas pulleys 38 are rotatably mounted on pulley shaft 40. The belts of conveyor section 32 are driven by a motor 46 carried by the frame structure and having a driven sprocket driving a drive chain 47. Chain 47 engages a sprocket affixed to pulley shaft 39 thereby to rotate the shaft and the pulleys affixed thereto. Conveyor section 33 is driven by a separate motor 51 which drives a chain 52 engaging a sprocket affixed to shaft 40.

Shaker mechanism 13 is comprised of a number of pairs of opposed confining arms such as opposed confining arms 56 and 57, the pairs of arms being spaced at intervals transversely across conveyor section 33. The forward arm 56 of each pair is secured to a shaft 58, and rear arm 57 of each pair is secured to a shaft 59. Arms 56 and 57 are pivoted relative to the frame supporting the arms by rotating shafts 58, 59 in opposed directions. The arms may be pivoted between the vertical position illustrated in Fig. 2, and a horizontal position wherein arms extend out horizontally with upper portions of the arms slightly below the top surface of belts 36 making up conveyor section 33. Mechanism such as fluid motor 60 connected to the arms by links 61 is provided for pivoting the arms between their lowered and their raised positions. The arms in their raised position define a confined treating zone or channel extending transversely across the top of conveyor section 33.

Associated with each of the confining arms is a positioning arm, such as positioning arm 62. The positioning arms are rotatably mounted on shaft 59. A snubber arm, such as snubber arm 63 is pivoted to the nonpivoted end of the two laterally outer positioning arms. The snubber arms are included for clamping onto a bundle of veneer sheets after the bundle has been shaken so as to hold the bundle tightly when turning the bundle from a vertical to a horizontal position. A fluid motor 65 between each rear confining arm 57 and its associated positioning arm provides a means for pivoting the positioning arm between the perpendicular position relative to the confining arm shown in Fig. 2, and an aligned position relative to the confining arm, the positioning arm swinging away from the confining arm. A fluid motor 66 between each snubber arm and the positioning arm mounting the snubber arm provides a means for swinging the snubber arm relative to the positioning arm. A number of shaker platform elements, such as platform element 64, are arranged laterally across the machine at the base of the confined treating zone defined by the confining arms, and mechanism is included for reciprocating up and down the platform elements so as to joggle a bundle of sheets carried by the elements between arms 56, 57, thereby to align the lower margins of the sheets in the bundle.

If the confining arms are in their horizontal position, and a bundle is placed over the rear set of arms 57, the leading or forward side of the bundle is turned downwardly when the arms are raised, the margins of the sheets along the base of the bundle aligning during a shake. If the bundle is placed over the forward set of arms, raising of the arms turns the rear or trailing side of the bundle downwardly. The shaker or jogger apparatus described hereinabove is more completely disclosed in a copending application of even date entitled "Sheet Bundle Handling Apparatus."

Cutter mechanism 12 includes a motor 71 having an output shaft 72 connected to a rotary disc-type cutterhead with teeth indicated at 73. The motor is secured to intermediate platform 74, which is pivoted to a base platform 76 as by pivot connection 77. The motor, base platform, and intermediate platform are movable as a unit in a lineal path transversely of the direction of travel of veneer through the apparatus.

Disposed beneath the base platform at the rear end of the platform is a runner portion 78 having a V-shaped groove formed therein which is superimposed over and fits on a rail member 79 having a V-shaped section and extending transversely of the apparatus. At the forward end of base platform 76 is a slide portion 81 which slides over the top of another rail member 82. Rail member 82 has a squared off upper edge which supports slide portion 81.

A chain 83 affixed by connection 84 to the lower side of base platform 76 provides a means for moving the motor and base platform back and forth on rail members 79 and 82. A reversible motor 86 rotates chain 83 in either direction, thereby to move the platform to and fro on the rail members. Chain 83 extends transversely across the apparatus having one end reeved about a sprocket driven by motor 86, and the other end reeved about a sprocket disposed on the opposite side of the apparatus away from motor 86.

The rotary disc-type cutterhead with teeth may take the form of several known constructions, such as the rotary jointer head disclosed in U.S. Patent 2,781,068 to Victor E. Anderson, dated February 12, 1957, and entitled "Rotary Jointer Head and Cutter." The cutterhead disclosed in this patent includes a disc-type wheel member having a discontinuous outer periphery made up of a plurality of recesses, the recesses containing cutting teeth. The teeth are mounted in the wheel portion of the cutterhead and are operable to slice through veneer sheets when the cutterhead is advanced through the sheets. A disc-type cutterhead produces a smooth, straight edge with a minimum amount of fraying and fracturing of the edges.

In operation, it has been found advantageous to cant or tilt the cutterhead a slight amount relative to the cut produced by the cutterhead. During a cutting pass, the cutterhead is canted so that the leading or cutting portions of the cutterhead are disposed inwardly against the body of veneer being cut, while the trailing portions of the cutterhead are spaced outwardly a slight distance from the cut produced by the head. Ordinarily, the cutterhead is inclined relative to the line of cut at an angle of only a few thousandths of a degree. By inclining the cutterhead, the cutterhead moves more freely and produces a smoother cut.

Motor 71 and the cutterhead are pivotable about pivot connection 77 to enable the cutterhead to make a cut moving in either direction in front of conveyor section 32. The various positions of the cutterhead are illustrated in Figs. 4 and 5. The positions are exaggerated in these figures for reasons of clarity. Referring to Figs. 4 and 5, the arrows indicate the direction in which the cutterhead is moving during a cutting pass. In Fig. 4 the cutterhead is shown moving downwardly in making a cutting pass, and the cutterhead is canted so that the lower portions of the cutterhead in the figure, which are the portions making the cut, are disposed rearwardly, or inwardly against any bundle being cut by the cutterhead. When the cutterhead is moving in the opposite direction, as in Fig. 5, the opposite side of the cutterhead is inclined rearwardly, or inwardly against a bundle.

A power actuated means is provided for canting the cutterhead. This may take the form of a remotely controlled double acting fluid motor 102. Motor 102 is pivotally connected at one end to base platform 76 and pivotally connected at its other end to ear 103 of intermediate platform 74.

The cutting station in the apparatus is located at the forward end of conveyor section 32 directly behind the cutter mechanism 12. Referring to Figs. 1 and 4, the base of the cutting station is comprised of a transverse horizontal anvil member 111 carried by the frame structure at the forward end of the belts of conveyor section 32. Anvil member 111 is notched to accommodate belts 34. To the rear of anvil member 111 is a horizontal table 112 carried by the frame beneath the upper portion of belts 34 and intermediate the front and rear pulleys mounting these belts. The table has cutouts 113 along its forward edge.

Shaft 39 mounting pulleys 37 is carried in frame members 18 by slidable bearing assemblies, such as assembly 114 in Fig. 4, accommodating a slight amount of vertical movement of the shaft. Cutouts 113 permit the conveyor belts to move downwardly below the top surface of table 112 and anvil member 111 when a bundle of veneer sheets is held against the top surface of the anvil member. Thus, a flat surface is presented by the anvil table when clamping onto a bundle.

Shaft 39 is moved up and down at the forward end of conveyor section 32 by means of double acting fluid motors such as motor 116. The cylinder portion of each motor is pivotally connected at 117 to the frame of the apparatus and the rod portion of the motor is connected to shaft 39 as by bearing 118.

The upper portion of the cutting station is defined by a clamping conveyor section 121 and an upper anvil member 122. Upper anvil member 122 extends transversely across the forward end of conveyor section 32 over anvil member 111. Anvil member 122 may take the form of a channel section, and is moved vertically up and down in an appropriate manner, as by a pair of laterally spaced double acting fluid motors, such as motor 126. The cylinders of these fluid motors are secured to the frame of the apparatus, and the rod portions of the motors are secured to anvil member 122 as by clevis 127 and pin 128.

Clamping conveyor section 121 is comprised of a plurality of laterally spaced belts, such as belt 131. Each belt is superimposed over a complementary belt in conveyor section 32. Each belt is mounted at its ends on suitable pulleys, such as pulleys 132 and 133. Each of the forward pulleys 132 is affixed to a pulley shaft 134 which is suspended from the frame structure of the apparatus by a pair of laterally spaced hanger bearings, represented by hanger bearing 136. Each hanger bearing 136 is affixed to a stud 137, which is inserted through an ear portion 138 carried by the frame structure. A compression spring 139 interposed between each ear portion 138 and each hanger bearing resiliently urges the hanger bearing downwardly, so that the forward end of the clamping conveyor section is urged by the springs of each hanger bearing downwardly toward table 112. The belts of the clamping conveyor section are driven by rotating pulley shaft 141, which is nonrotatably secured to rear pulleys 131. Shaft 141 is rotated by chain 47 which engages a sprocket affixed to the shaft, chain 47 also traveling around an idler sprocket 142 mounted on the frame of the apparatus.

A fence mechanism 146 defines the forward end of the cutting station. Referring to Figs. 1 and 6, the fence mechanism comprises a horizontal transverse bar member 147 swingably supported from a cross member 148 of the frame by spaced drop members 149. The bar member is spaced slightly in front of the forward edges of the anvil members, and positions the side of a bundle prior to a cut. Drop members 149 are pivotally connected at upper and lower portions to frame member 148 and bar 147, respectively. An extension 151 of one of the drop members protrudes above frame member 148 and is pivotally connected to a rod 152 of double acting fluid motor 153. The cylinder of fluid motor 153 is secured to the frame structure as by bracket 154.

Referring to Fig. 6, contraction of fluid motor 153 serves to swing bar member 147 up and to the right in Fig. 6 (to the position shown in dotted outline in Fig. 6) thereby to accommodate movement of the cutter mechanism beneath the bar during a cutting pass. The bar member afterwards may be swung in the other direction by extension of the fluid motor.

The fence, in addition to stopping forward progress of a bundle delivered by conveyor section 32, also carries switch members which are actuated by movement of a bundle against the switch members to stop motor 46 driving the conveyor belts of conveyor stations 32 and 121. These switch members are represented by switch contact pads 156 carried by fence bar 147 rearwardly of the bar. The contact pads when depressed open the circuit to electric motor 46.

Secured to the frame forwardly of the cutting station above motor 71, and inclined upwardly to the left in Fig. 1, are a pair of guide rails 161 and 162. A similar pair of guide rails are located on the laterally opposite side of the apparatus. With reference to Fig. 7, these rails may take the form of channel irons having strips 163 secured to their bases. The strips function as the guide portions for the rails.

Each of the guide rails mounts a carriage leg, indicated for the forward rail at 166, and for the rear rail at 167. The carriage legs mount rollers 170 riding between strips 163 of the guide rails. Carriage legs 166, 167 are secured at their lower ends to the frame 168 of a carriage 169. The carriage is movable in the guide structure to receive and to discharge bundles transferred thereon from the cutting station.

The carriage includes a series of laterally spaced conveyor belts illustrated by belt 171. The belts ride about pulleys 172 and 173, secured to pulley shafts 174 and 176, respectively, which are rotatably mounted in frame 168. The belts are moved in either direction by means of reversible motor 181 carried by the frame of the carriage and driving a drive chain 182.

The loading position for the carriage is indicated by the dotted outline in Fig. 1. In this position the carriage is lowered so that the upper surfaces of the belts of the carriage are in substantial horizontal alignment with the belts of conveyor section 32. The discharge position for the carriage is spaced upwardly and forwardly from the loading position, and is indicated by the solid lines in Fig. 1.

The carriage is movable between its loading and discharge positions by means of double acting fluid motor 183 shown in Fig. 3. Referring to Figs. 1 and 3, the rod of motor 183 is secured to a plate 184. Affixed to plate 184 are four lines 185, 186, 187, and 188. Line 188 extends around pulleys 189 and 190 and has its other end affixed by a buckle to the upper end of leg 166 on one side of the apparatus. Line 186 extends around pulleys 191, 192, and 193 to the upper end of leg 167 on the same side of the machine. Line 185 is reeved about a pulley 194 and has its lower end affixed to the top of leg 166 on the other side of the apparatus. Line 187 extends around pulleys 195 and 196 to the top of leg 167 on the other side of the apparatus. Contraction of fluid motor 183 moves carriage 169 upwardly, and expansion of the motor lowers the carriage.

Depending from horizontal member 16 and carried forwardly of the carriage 169 in its discharge position is a conveyor section 197. Conveyor section 197, like the other conveyors discussed, is comprised of laterally spaced belts such as belt 198, each belt being supported at its ends by a pair of pulleys, 199 and 200. These pulleys are affixed to pulley shafts which are rotatably supported at their ends in the frame of the apparatus. The belts of the conveyor section are turned in a clockwise direction in Fig. 1 by a chain 201 engaging a sprocket affixed to the forward pulley shaft and driven by a motor 202. Motor 202 is secured to the frame structure of conveyor section 197.

Forwardly of conveyor section 197 is another conveyor section 203. Conveyor sections 197 and 203 make up the return conveyor mechanism in the apparatus. Conveyor section 203 includes a frame 204 rotatably mounting at its ends pulley shafts 206 and 207. Pulleys, such as pulleys 208, 209, are affixed to these pulley shafts. These pulleys mount a plurality of laterally spaced belts, represented by belt 211. The belts of the conveyor section are turned by a sprocket affixed to pulley shaft 207 driven by chain 212 and motor 213. Motor 213 is carried by frame 204 of the conveyor section.

The inner end of frame 204 of conveyor section 203 is affixed at each of its sides to a leg member 216 having rollers 215. These leg members reciprocate in guide rails, such as guide rail 217, which resemble 161, 162. The leg members are interconnected and braced by cross member 218. Conveyor section 203 is movable between a loading position wherein the conveyor is substantially in horizontal alignment with conveyor section 197 and a discharge position wherein the conveyor section has moved downwardly so that the upper surfaces of the belts in the conveyor section are substantially level with the upper surfaces of the belts in conveyor section 33. The belts of conveyor section 203 are spaced latereally intermediate the belts of section 33, which enables the conveyor section to move to the level of conveyor section 33.

Conveyor section 203 is moved up and down on guide rails 217 by a chain 221 affixed at 222 to one of the legs 216 supporting the conveyor section. Chain 221 is reeved at its ends about sprockets 223 and 224. Sprocket 224 is an idler sprocket, and sprocket 223 is driven by a shaft 226, a sprocket 227, a drive chain 228, and a motor 229.

The operation of the apparatus described is as follows: Bundles of veneer are first deposited on conveyor section 33, and motor 51 actuated so that the upper portions of the belts in the conveyor section travel from right to left in Figs. 1 and 2. Confining arms 56 and 57 of the jogger mechanism are moved to a horizontal position, and positioning arms 62 are moved to a vertical position, to prepare the jogger mechanism to receive a bundle. In this condition of the parts, a bundle is carried by belts 36 up against the rear sides of the positioning arms, which halts forward movement of the bundle. Motor 51 is then stopped.

Fluid motor 60 is then actuated to raise the confining arms. This operates to turn the bundle, which is resting over the rear set of confining arms, so that the lead or forward side of the bundle is turned downwardly. The bundle is now in a vertical position and ready to be shaken. Actuation of the jogger apparatus moves platform elements 64 up and down, which functions to shake the bundle and to align the lower margins of the veneer sheets in the bundle. The operation of the jogger is fully described in the co-pending application mentioned hereinabove. After shaking, motors 66 are actuated to swing the snubber arms over against the bundle. The confining arms are subsequently lowered to a horizontal position, the bundle turning over to the right with confining arm 57 in Fig. 2, with the leading margins of the sheets in the bundle aligned.

The positioning and snubber arms are then lowered to a horizontal position by suitable actuation of motors 65 and 66. The bundle may then be moved forwardly by actuation of motors 51 and 46 into the cutting station and against fence mechanism 146. The fence stops forward progress of the bundle, conveyor belts 34 and 131 of conveyor sections 32 and 121 stopping when the bundle engages switch fingers 156 so as to open the circuit to motor 46.

When a bundle of veneer is positioned in the cutting station, fence bar 147 is swung to one side and upwardly by actuation of motor 153. The fence bar preferably is swung outwardly in the direction in which the cutter is to travel in the next cutting pass. Movement of the fence bar frees the forward side of the bundle for cutting. Prior to a cut, the bundle is clamped between anvil members 111 and 122 by actutation of motors 126. The cutterhead of the cutter mechanism is also canted prior to a cut, depending upon the direction of the cutterhead during the cut, by actuation of motor 102, so that the cutterhead is appropriately inclined relative to its line of cut.

After a straight edge has been cut across the leading margins of the sheets in the bundle, by actuation of motor 86 and movement of the cutter across the forward end of conveyor section 32, carriage 169 is moved downwardly to the lowered position indicated by dotted lines in Fig. 1. It should be understood that the cutter has been moved by chain 83 laterally to one side of the machine to accommodate movement of the carriage to this lowered position. Motor 181 is then actuated to move the upper portions of the conveyor belts in the carriage from right to left in Fig. 1, and motor 46 is also actuated to cause the belts of conveyor sections 32 and 121 to move the bundle outwardly and forwardly from the cutting station. When the bundle reaches a central position over the carriage, the various motors are stopped and the carriage raised to its discharge position, illustrated by the solid lines in Fig. 1.

After the carriage has reached its raised or discharge position, motors 181, 202, and 213 are actuated so as to move the bundle from left to right in Fig. 1, or rearwardly, until the bundle overlies the rear portion of conveyor section 203. The motors are then stopped, motor 213 when stopped serving to break further rearward movement of the bundle. Conveyor section 203 is then lowered into alignment with conveyor section 33, to place the bundle over confining arms 56 at the forward end of the jogger mechanism. When the confining arms are then raised, in the manner described above, the bundle is turned by the arms so that its rear side is turned under. This side is then turned forwardly when the confining arms are subsequently lowered, as discussed above. In this manner, the bundle is turned over prior to recirculation past the cutting station, and both sides of the bundle are trimmed by the cutter.

By moving the bundle of veneer forwardly and beyond the cutter mechanism, the cutting station is cleared quite speedily. This enables the cutting station to receive a subsequent bundle with a minimum amount of wasted time. The subsequent bundle is cut while the preceding bundle is returned to the jogger mechanism. In this manner, economies in manufacture result. The bundles of veneer sheets are introduced into the cutting station serially, that is, one at a time, and for maximum production, a new bundle is introduced as soon as a cut bundle is removed and fence 146 dropped to the lowered position illustrated in Fig. 1.

The series of bundles delivered into the cutter mechanism from the shaker mechanism is comprised partially of new bundles which have not been cut on either of their sides, and partially of bundles which have been cut along one of their sides. When a bundle passes through the cutting station which has been cut on both of its sides, carriage 169 is not raised to its discharge position, but instead is operated to transport the bundle directly forwardly to an outfeed conveyor 231. In other words, a bundle treated on both of its sides is not recirculated, but is transported forwardly through the apparatus.

The margins of the veneer sheets may be cut using a cutter mechanism traveling only in one direction during a cutting pass. In this case, however, the carriage is not lowered to receive a bundle until the cutter mechanism has had a chance to return to its base or starting position. The cutter may be moved during its return at a greater speed than the movement of the cutter during a cutting pass, since the cutter is not encumbered during its return. When cutting with the cutter moving in only one direction, the pivotal platform mounting the cutter is not necessary.

When the cutter is used to produce a cut moving in either direction, the cutter is moved in either direction at approximately the same rate of speed. Further, in order that the cutterhead clear itself and in order to produce a smooth edge, the canting arrangement for the cutterhead described hereinabove is highly desirable. Assuming that the cutterhead rotates in a counterclockwise direction viewing from right to left in Figs. 4 and 5, when the cutter moves downwardly in Fig. 4 during a cutting pass, the lower anvil member supports the bundle against the shearing forces produced by the cutterhead. On moving upwardly in Fig. 5, the upper anvil member supports the bundle against these shearing forces. The two anvil members function as clamping members securely holding the bundle adjacent the cutter regardless of the direction of cut.

It is appreciated that various modifications and changes may be made in the apparatus and method hereindisclosed without departing from the spirit and scope of this invention. It is desired not to be limited by the specific constructions and method hereindescribed, but to cover all modifications and arrangements which would be apparent to one skilled in the art and that come within the scope of the appended claims.

It is claimed and desired to secure by Letters Patent:

1. A method of producing straight edged veneer sheets which comprises a conveying a series of sheets of elongated veneer transversely of their length into a cutting station, clamping each sheet when it occupies the cutting station in a stationary position and cutting a straight edge along the forward margin of the sheet while it is held stationary using a cutter moving transversely of the path of travel for the sheet, advancing in series the veneer sheets after cutting forwardly and transversely of their length through and beyond said cutting station thereby to free said station for a subsequent cutting operation, removing at intervals from the series of sheets advanced from the cutting station those sheets which are cut along only one margin and returning these sheets to a station spaced rearwardly of said cutting station, and interspersing these sheets with the uncut margins of the sheets positioned as the forward margins with new sheets to form the series of sheets conveyed into said cutting station.

2. A method of producing straight edged veneer sheets which comprises conveying a bundle of elongated sheets transversely of their length into a shaking station and shaking the bundle in a direction extending transversely of the sheet lengths to align the sheet margins on one side of the bundle in a direction extending transversely of the sheet lengths, transporting the bundle forwardly into a cutting station, with the aligned margins leading the bundle, clamping the bundle when it occupies the cutting station in a stationary position and cutting a straight edge while the bundle is held stationary and using a cutter moving transversely of the path of travel of the bundle along the aligned margins of the sheets of the bundle in a direction extending transversely of the sheet lengths, advancing the bundle forwardly through and beyond said cutting station thereby to free the station for a subsequent cutting operation, treating another bundle of sheets having aligned sheet margins on one of its sides in a similar manner by conveying the bundle forwardly into said cutting station and cutting a straight edge along the aligned margins of the sheets of the bundle, simultaneously with the treatment of the other bundle preparing the first bundle by returning the bundle to said shaking station and shaking the bundle in a direction extending transversely of the sheet lengths to align the sheet margins on the other side of the bundle, advancing the other bundle forwardly through and beyond said cutting station, and recirculating the first bundle by conveying the bundle in a direction extending transversely of the sheet lengths into said cutting station with the newly aligned margins leading the bundle and cutting the aligned margins on the other side of the bundle.

3. A method of producing straight edged veneer sheets which comprises conveying in a series elongated bundles of veneer sheets along a direction extending transversely of the length of the bundle into a shaking station, shaking each bundle while in said shaking station in a direction extending laterally of the bundle to align the sheet margins on one side of the bundle, transporting the bundles in a series and in a direction extending transversely of their length from said shaking station into a cutting station, clamping each bundle when it occupies the cutting station in a stationary position and cutting a straight edge along the aligned margins of the sheets of a bundle while the bundle is held stationary and using a cutter moving transversely of the path of travel for the bundle, advancing the bundles after cutting forwardly through and beyond said cutting station and in a direction extending transversely of their length thereby to free said station for a subsequent cutting operation, removing at intervals from the series of bundles advanced from the cutting station those bundles having sheets cut along only one margin and returning these bundles, and interspersing these bundles with uncut bundles to form the series of bundles conveyed into said shaking station.

4. The method of claim 3 wherein the aligned margins of the sheets of a bundle are cut using a rotating disc cutterhead, and wherein successive bundles are cut first by moving the cutterhead in one direction across the path of travel of the bundles, and then by moving the cutterhead in the opposite direction across said path, wherein the cutterhead is shifted prior to each cut so as to incline the cutterhead relative to the line of cut and place those portions of the cutterhead which are to be the tailing portions outwardly and to one side of the line of cut from the bundle.

5. Apparatus for cutting straight edges in bundles of veneer sheets comprising a frame, an elongated driven conveyor mechanism mounted on said frame, a shaker mechanism and a cutter mechanism spaced along said conveyor mechanism and mounted on said frame, said shaker mechanism shaking the bundles of veneer transported on said conveyor thereby to align the veneer margins on one side of the bundles, said cutter mechanism being spaced forwardly of said shaker mechanism and cutting the aligned margins of veneer bundles transported on said conveyor, guide structure mounted in said frame forwardly of said cutter mechanism, a carriage mounted in said guide structure for receiving and discharging bundles moved forwardly onto said carriage from said cutter mechanism, said carriage moving on said guide structure between a loading position wherein a bundle may be moved off said conveyor forwardly of said cutter mechanism onto said carriage and a discharge position spaced from said loading position, and a return conveyor mechanism mounted on said frame and operable to receive bundles discharged by said carriage at said discharge position and transport them rearwardly around said cutter mechanism toward said shaker mechanism, said return conveyor mechanism returning bundles to the forward end of said shaker mechanism, said shaker mechanism on actuation lifting a bundle and turning the rearmost side of the bundle downwardly, and shaking the bundles so as to align the veneer margins on the downward side of the bundle.

6. Apparatus for cutting straight edges in bundles of veneer sheets comprising a frame, an elongated driven conveyor mechanism mounted on said frame, a cutter mechanism mounted at the forward end of said conveyor mechanism having a rotary disc cutterhead movable during a cut in a lineal cutting path extending transversely of said conveyor, clamp means spaced rearwardly of said cutter mechanism engaging top and bottom sides of a bundle for holding securely a bundle of veneer sheets during a cut by said cutterhead, guide structure mounted in said frame forwardly of said cutter mechanism, a carriage for receiving and discharging bundles mounted in said guide structure, said carriage moving on said guide structure between a loading position wherein a bundle may be moved off said conveyor forwardly of said cutter mechanism onto said carriage, and a position spaced from said loading position accommodating movement of said cutterhead in its cutting path, and means for canting said cutterhead relative to its lineal cutting path whereby said cutter mechanism may make a cut with said cutterhead inclined at an acute angle relative to the cut made by the cutterhead with the leading portions of the cutterhead disposed inwardly against a bundle moving in either direction across the forward end of said conveyor mechanism.

7. Apparatus for cutting straight edges in bundles of veneer sheets comprising a frame, an elongated driven conveyor mechanism mounted on said frame and adapted to transport sheets transversely of their length along a treating path, a shaker mechanism and a cutter mechanism spaced at intervals along said treating path, said shaker mechanism including means for turning the bundle either forwardly on the conveyor mechanism or rearwardly on the conveyor mechanism, said cutter mechanism being spaced forwardly of the shaker mechanism and operable to cut the forward edges of veneer bundles transported on said conveyor mechanism, guide structure mounted on said frame forwardly of said cutter mechanism defining a path extending upwardly from the plane of said conveyor and terminating at its upper end in a discharge end, a carriage mounted on said guide structure for movement up and down on the path defined by the guide structure adapted to receive and then to discharge bundles, a return conveyor mechanism mounted on said frame above said cutter mechanism and at the discharge end of said guide structure adapted to receive bundles discharged by said carriage at said discharge end and transport them rearwardly over said cutter mechanism toward said shaker mechanism, said conveyor mechanism including means for lowering a bundle onto said shaker mechanism with the bundle in position to be turned rearwardly on said conveyor mechanism by said shaker mechanism.

References Cited in the file of this patent
UNITED STATES PATENTS

| | | |
|---|---|---|
| Re. 542 | Ferry | Apr. 6, 1858 |
| 519,682 | Randall | May 8, 1894 |
| 909,454 | Pye | Jan. 12, 1909 |
| 1,062,814 | Barnhardt | May 27, 1913 |
| 1,661,767 | Loetscher | Mar. 6, 1928 |
| 2,669,263 | Smith | Feb. 16, 1954 |
| 2,834,384 | Pearl | May 13, 1958 |